US010012166B1

(12) United States Patent
Dudar

(10) Patent No.: US 10,012,166 B1
(45) Date of Patent: Jul. 3, 2018

(54) SYSTEM AND METHOD FOR DIAGNOSING A POSTIVE CRANKCASE VENTILATION VALVE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 15/373,154

(22) Filed: Dec. 8, 2016

(51) Int. Cl.
| | |
|---|---|
| *F02D 41/22* | (2006.01) |
| *B60W 20/50* | (2016.01) |
| *B60N 2/00* | (2006.01) |
| *F01M 13/00* | (2006.01) |
| *F02D 41/00* | (2006.01) |

(52) U.S. Cl.
CPC .......... *F02D 41/221* (2013.01); *B60N 2/002* (2013.01); *B60W 20/50* (2013.01); *F01M 13/0011* (2013.01); *F02D 41/0025* (2013.01); *F01M 2013/0083* (2013.01); *F02D 2200/04* (2013.01); *Y10S 903/93* (2013.01)

(58) Field of Classification Search
CPC .............. F02D 41/221; F02D 2200/04; F02D 41/0025; F01M 13/0011; F01M 2013/0083; B60N 2/002; B60W 20/50; Y10S 903/93
See application file for complete search history.

(56) References Cited

U.S. PATENT DOCUMENTS

| | | | | |
|---|---|---|---|---|
| 1,971,620 A | * | 8/1934 | Pierce ...................... | B63H 5/10 123/190.3 |
| 3,864,964 A | * | 2/1975 | Voelz .................. | G01M 15/108 73/114.71 |
| 5,792,949 A | * | 8/1998 | Hewelt ................. | G01M 3/025 123/41.86 |
| 5,897,597 A | * | 4/1999 | O'Daniel .............. | G01M 3/025 123/574 |
| 6,237,546 B1 | * | 5/2001 | Gander ..................... | F01L 9/04 123/41 E |
| 7,564,208 B2 | | 7/2009 | Bailey et al. | |

(Continued)

OTHER PUBLICATIONS

Dudar, Aed M., "Fuel Vapor Purging Diagnostics for a Multi-Path Purge Ejector System," U.S. Appl. No. 15/143,185, filed Apr. 29, 2016, 57 pages.

*Primary Examiner* — Behrang Badii
*Assistant Examiner* — Daniel L Greene
(74) *Attorney, Agent, or Firm* — Julia Voutyras; McCoy Russell LLP

(57) ABSTRACT

Methods and systems are provided for diagnosing a positive crankcase valve during a vehicle key-off event. In one example, a method may include controlling a fluid flow from a crankcase of an engine to an intake manifold of the engine via a positive crankcase ventilation valve, and indicating whether the positive crankcase valve is stuck open responsive to spinning the engine unfueled in a reverse direction, and indicating whether the positive crankcase valve is stuck closed responsive to spinning the engine fueled but without spark in a forward direction. In this way, functionality of a positive crankcase ventilation valve may be diagnosed effectively during key-off conditions, which may prevent or reduce engine complications arising from a stuck open or stuck closed positive crankcase valve.

20 Claims, 7 Drawing Sheets

(56) References Cited

U.S. PATENT DOCUMENTS

| | | | |
|---|---|---|---|
| 8,181,631 B2* | 5/2012 | Bohr | F02M 25/089 123/520 |
| 8,219,303 B2 | 7/2012 | Schwenke et al. | |
| 8,739,766 B2* | 6/2014 | Jentz | F02N 11/003 123/516 |
| 9,188,505 B2 | 11/2015 | Martin | |
| 9,228,557 B1* | 1/2016 | Pursifull | F02N 19/02 19/2 |
| 2009/0211545 A1 | 8/2009 | Satou | |
| 2011/0120789 A1* | 5/2011 | Teraya | B60K 6/445 180/65.25 |
| 2013/0152905 A1* | 6/2013 | Woods | F02M 33/04 123/520 |
| 2014/0081548 A1 | 3/2014 | Pursifull et al. | |
| 2014/0081549 A1* | 3/2014 | Rollinger | F01M 13/00 701/101 |
| 2014/0081551 A1 | 3/2014 | Rollinger et al. | |
| 2014/0081564 A1 | 3/2014 | Pursifull et al. | |
| 2014/0107903 A1* | 4/2014 | Kawazu | F02D 41/0097 701/101 |

\* cited by examiner

SYSTEM AND METHOD FOR DIAGNOSING A POSTIVE CRANKCASE VENTILATION VALVE

FIELD

The present description relates generally to methods and systems for controlling a vehicle engine to diagnose whether a positive crankcase ventilation valve is functioning as desired.

BACKGROUND/SUMMARY

Engines may include crankcase ventilation systems to vent gases out of the crankcase and into an engine intake manifold to provide continual evacuation of gases from inside the crankcase in order to reduce degradation of various engine components in the crankcase. The crankcase ventilation system may include a positive crankcase ventilation valve (PCV valve) for enabling one-way flow of crankcase gases from inside the crankcase to the intake manifold.

Crankcase ventilation systems may be intermittently diagnosed for PCV valve degradation. One example approach for PCV valve diagnostics is shown by Satou in US 2009/0211545. Therein, PCV valve degradation is determined based on air changes (e.g., changes to a throttle position) and fuel changes (e.g., fuel injection adjustments) required to maintain an idle speed as an opening of the PCV valve is adjusted. The opening of the PCV valve is, in turn, selected based on an air/fuel ratio of blow-by gas.

However, the inventors herein have recognized potential issues with such approaches. As one example, the blow-by based diagnostics approach may have significant noise issue due to various engine loads. These include, for example, engine friction, barometric pressure, AC compressor load, alternator load, etc. Consequently, computation intensive noise reduction algorithms may be required.

In one approach, to at least partially address these issues, a method for an engine crankcase ventilation system is provided. The method comprises controlling a fluid flow from a crankcase of an engine to an intake manifold of the engine via a positive crankcase ventilation valve, and in a first condition, indicating whether the positive crankcase valve is stuck open responsive to spinning the engine unfueled in a reverse direction, and in a second condition, indicating whether the positive crankcase valve is stuck closed responsive to spinning the engine fueled in a forward direction.

As one example, the method may further comprise indicating pressure in a crankcase ventilation tube via a pressure sensor, the crankcase ventilation tube fluidically coupling the crankcase to an air intake system configured to draw intake air into the engine. In the first condition, the method may include indicating the positive crankcase valve is stuck open responsive to an increase in pressure in the crankcase ventilation tube above a predetermined pressure change threshold as indicated via the pressure sensor.

In one example, the method may further comprise indicating an air/fuel ratio in the intake manifold of the engine via an intake air oxygen sensor, and in the second condition, indicating the positive crankcase valve is stuck closed responsive to the indicated air/fuel ratio less than a predetermined air/fuel ratio threshold. In this way, a positive crankcase valve may be diagnosed as to whether the positive crankcase valve is either stuck open or stuck closed. By periodically diagnosing the positive crankcase valve, engine complications due to a stuck open or closed positive crankcase valve may be reduced, or avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for diagnosing whether a positive crankcase valve (PCV) is functioning as desired, or if the positive crankcase valve is stuck in a closed configuration, or an open configuration. Such a diagnostic may be performed on a vehicle system configured with a positive crankcase ventilation system, such as the vehicle system depicted in FIG. 1. Conducting the diagnostic procedure on the PCV valve may include first spinning an engine in a reverse direction, via an electric motor configured to spin the engine in a reverse mode of operation, and then spinning the engine in a forward direction via the electric motor configured to spin the engine in a forward mode of operation. Accordingly, the vehicle system may include an electric motor, such as the vehicle system depicted at FIG. 2.

Figure 5A:
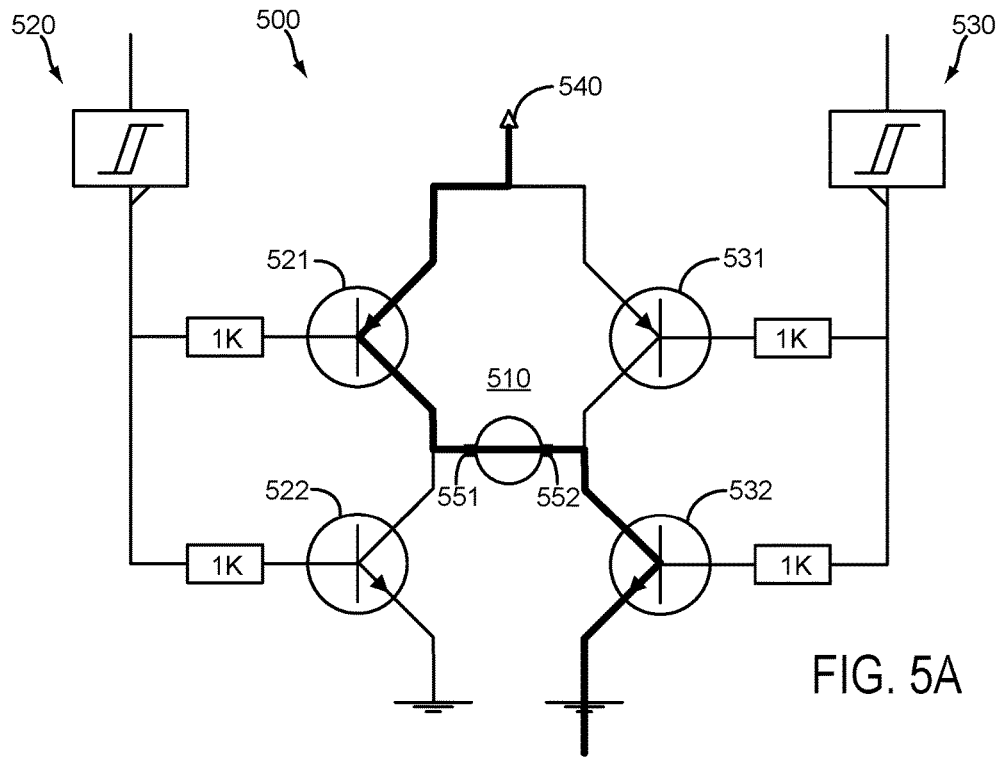
FIG. 5A-5B show a schematic depiction of an electronic circuit configured to reverse the spin orientation of an electric motor.
Figure 5B:
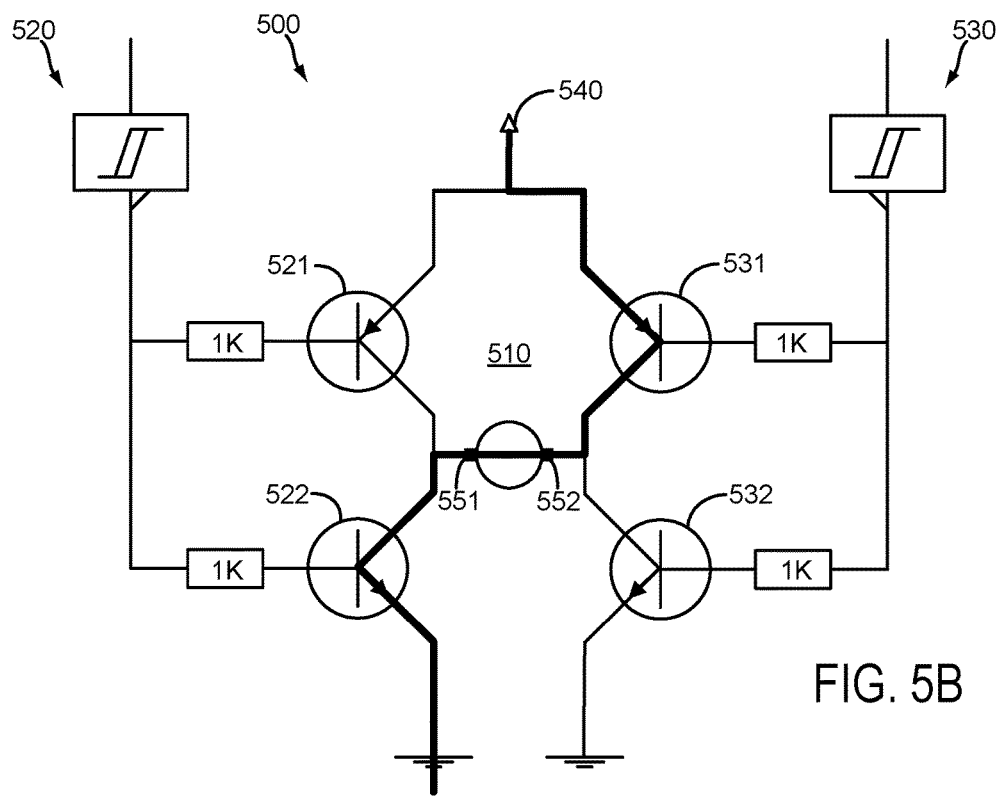
Figure 6:
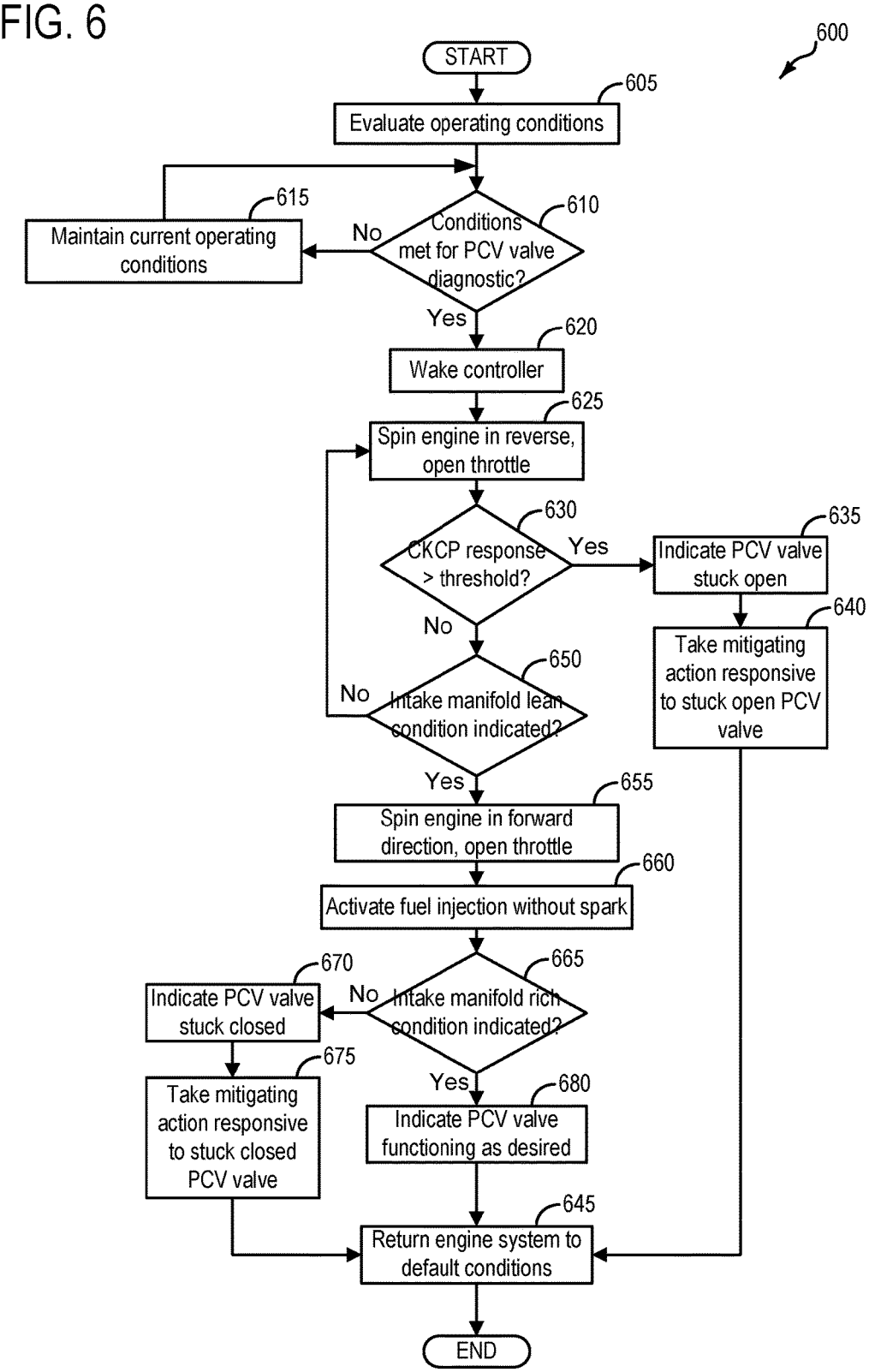
FIG. 6 shows a high level flowchart for an example method for diagnosing functionality of a PCV valve.
Figure 7:
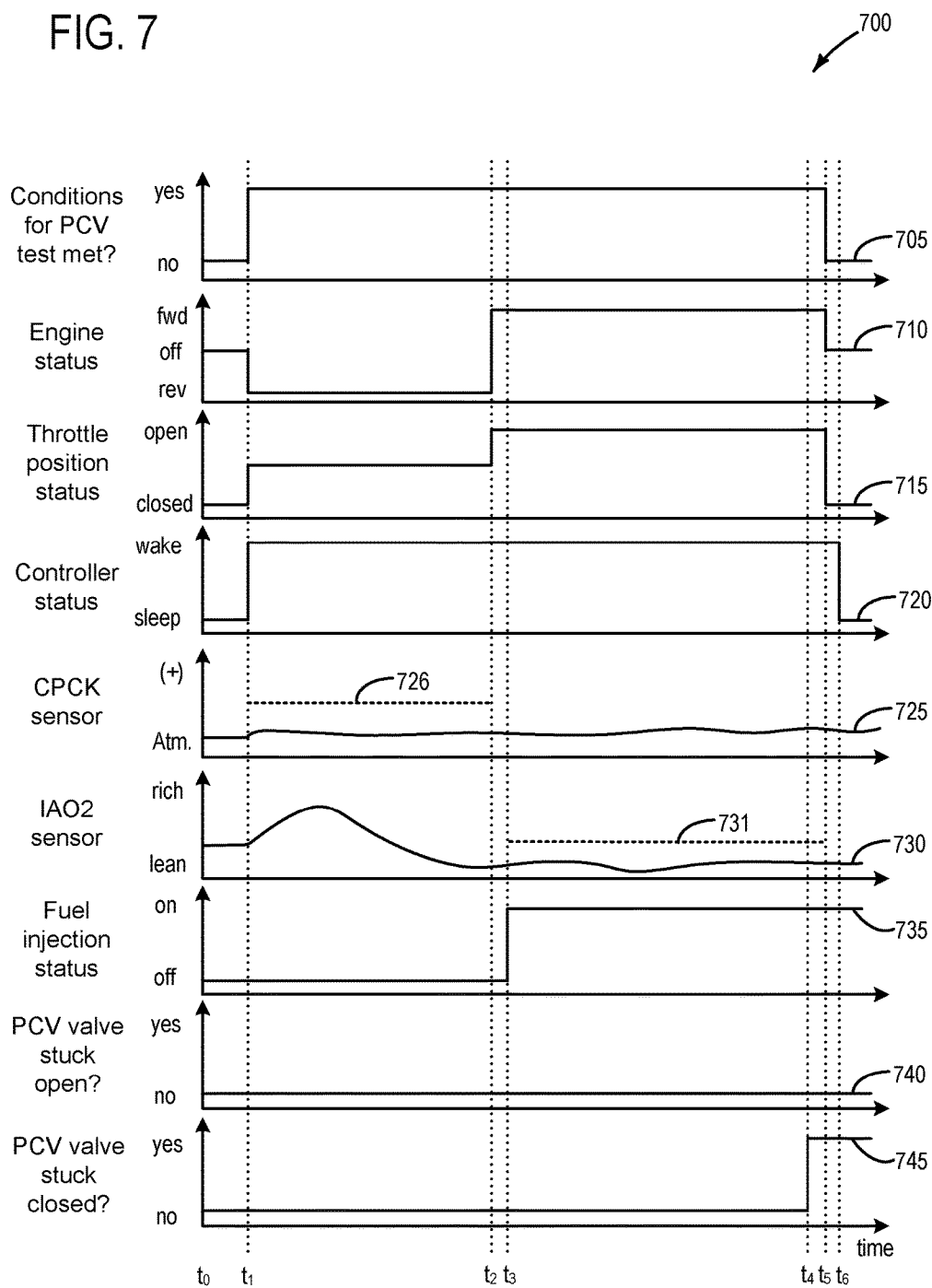
FIG. 7 shows a timeline for an example PCV diagnostic test procedure.

The PCV valve may occupy several different conformations, depending on a pressure level in an intake manifold of the engine, as illustrated in FIG. 3. To diagnose whether the PCV valve is stuck open, the engine may be spun in the reverse direction, without fueling and spark. In such a condition, if the PCV valve is stuck open, then positive pressure may be routed along a first flowpath, indicated at FIG. 4, and may be monitored via a crankcase pressure sensor. To diagnose whether the PCV valve is stuck closed, the engine may be spun with fuel to one or more engine cylinders provided, but without spark provided to the one or more engine cylinders. In such a condition, if the PCV valve is not stuck closed, the fuel vapor may be routed to the intake manifold, along a second flowpath, indicated at FIG. 4. Spinning the engine in the forward and reverse direction via an electric motor may be accomplished via an electronic circuit configured to reverse direction of an electric motor, illustrated at FIGS. 5A-5B. An example method for conducting the PCV valve diagnostic test procedure is illustrated at FIG. 6. An example timeline for conducting the PCV valve diagnostic, according to the method of FIG. 6, is illustrated at FIG. 7.

Figure 1:
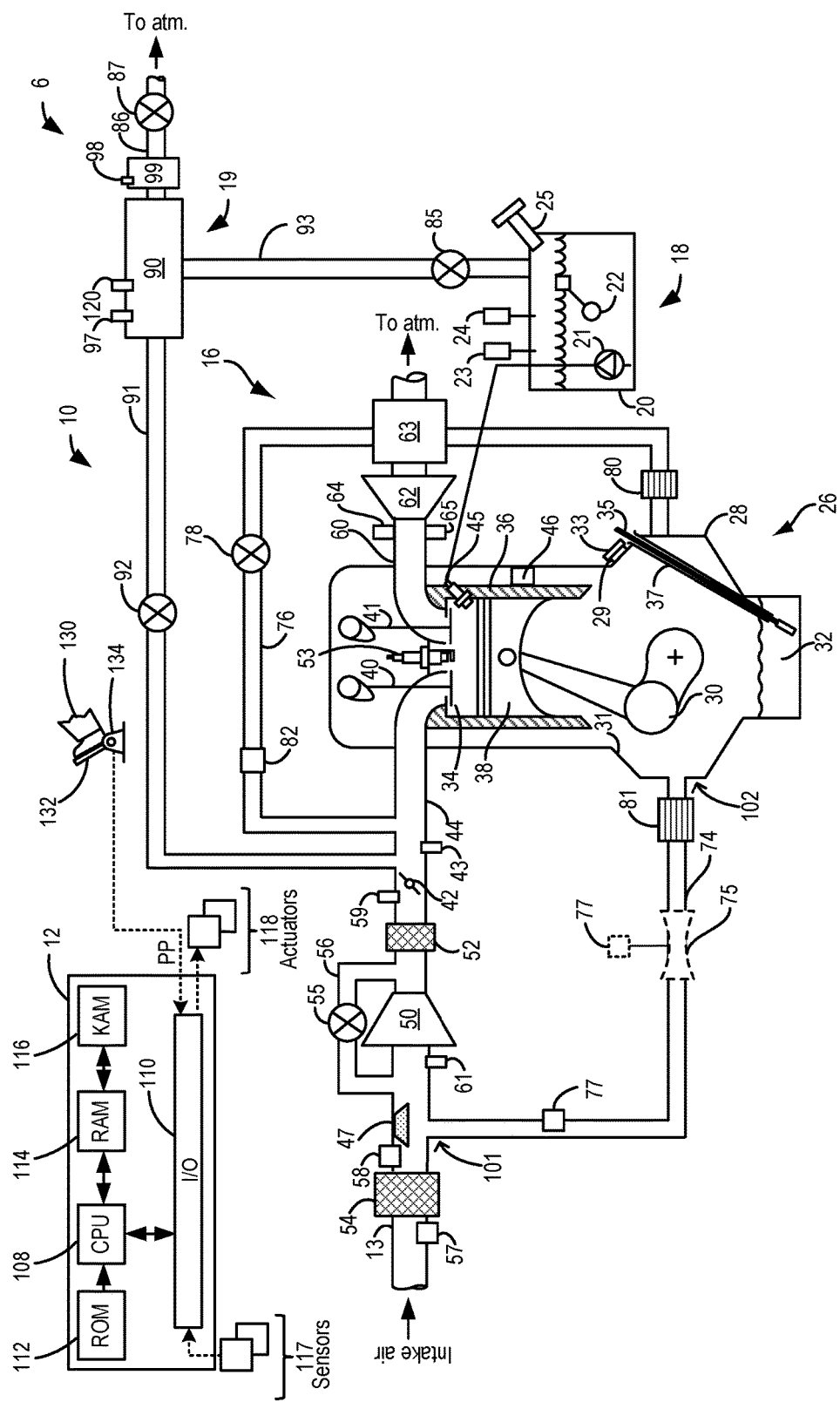
FIG. 1 shows a schematic description of an engine including an engine positive crankcase ventilation system (PCV).

Turning now to FIG. 1, a schematic depiction of a hybrid vehicle system 6 is presented that can derive propulsion power from engine system 10 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

In some embodiments, each cylinder of engine 10 may include a spark plug 53 for initiating combustion. An ignition system (not shown) may provide an ignition spark to cylinder 34 via spark plug 53 in response to a spark advance signal from a controller, under select operating modes.

A throttle 42 may be disposed in the engine intake to control the airflow entering intake manifold 44 and may be preceded upstream by compressor 50 followed by charge air cooler 52, for example. An air filter 54 may be positioned upstream of compressor 50 and may filter fresh air entering intake passage 13. The intake air may enter combustion chamber 34 via electrically-actuated intake valve system 40. Likewise, combusted exhaust gas may exit combustion chamber 34 via electrically-actuated exhaust valve system 41. In an alternate embodiment, one or more of the intake valve system and the exhaust valve system may be cam-actuated. The intake and exhaust valve systems are discussed in further detail herein and with reference to FIG. 2. Intake air may bypass compressor 50 via compressor bypass conduit 56, during conditions wherein compressor bypass valve (CBV) 55 is opened. In this way, pressure buildup at the compressor inlet may be relieved.

In some examples, an intake air oxygen sensor 43 may be positioned downstream of throttle 42. Furthermore, in some examples, an air intake system hydrocarbon (AIS HC) trap 47 may be positioned downstream of air filter 54, but upstream of compressor 50. As will be discussed in greater detail below, during conducting a PCV valve 78 test diagnostic procedure, residual fuel vapors may be captured and stored by AIS HC trap, such that fuel vapors are not routed to atmosphere. Furthermore, the intake air oxygen sensor may be used as a readout of the PCV valve test diagnostic to determine whether the PCV valve 78 is functioning as desired, as will be discussed in greater detail below.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63 mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor, referred to herein as a crankcase pressure sensor (CKCP sensor) 77. When configured as a pressure sensor, CKCP sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled valve that is controlled by controller 12. Additionally or alternatively, PCV line 76 may include a one-way valve (that is, a passive valve that tends to seal when flow is in the opposite direction) to prevent airflow from the intake manifold into the crankcase via PCV line 76 during boost conditions. In one embodiment, the PCV valve may actively or passively vary its flow restriction in response to the pressure drop across it (or flow rate through it). It will be appreciated that, as used herein, PCV flow refers to the flow of gases through PCV line 76 from the crankcase to the intake manifold. Similarly, as used herein, PCV backflow refers to the flow of gases through PCV line 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 8 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor canister 90, via conduit 93, before being purged to engine intake manifold 44.

Fuel vapor canister 90 may be comprised in evaporative emissions system 19. Fuel vapor canister 90 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 90 may be purged to engine intake passage 13 by opening canister purge valve 92. A loading state of vapor canister 90 may be indicated by a hydrocarbon sensor 120. While a single canister 90 is shown, it will be appreciated that fuel system 18 may include any number of canisters. In one example, canister purge valve 92 may be a solenoid valve wherein opening or closing of the valve is performed via actuation of a canister purge solenoid.

Canister 90 may include a buffer (or buffer region), each of the canister and the buffer comprising the adsorbent. The volume of the buffer may be smaller than (e.g., a fraction of) the volume of canister 90. The adsorbent in the buffer may be same as, or different from, the adsorbent in the canister (e.g., both may include charcoal). The buffer may be positioned within canister 90 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent 86 for routing gases out of the canister 90 to the atmosphere when storing, or trapping, fuel vapors from fuel tank 20. Vent 86 may also allow fresh air to be drawn into fuel vapor canister 90 when purging stored fuel vapors to engine intake passage 13 via purge line 91 and purge valve 92. While this example shows vent 86 communicating with fresh, unheated air, various modifications may also be used. Vent 86 may include a canister vent valve 87 to adjust a flow of air and vapors between canister 90 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 85 may be optionally included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 85 positioned along conduit 93, in alternate embodiments, the isolation valve may be mounted on fuel tank 20. The fuel system may be considered to be sealed when isolation valve 85 is closed. In embodiments where the fuel system does not include isolation valve 85, the fuel system may be considered sealed when purge valve 92 and canister vent valve 87 are both closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85. In some embodiments, a pressure sensor may additionally be coupled between the canister 90 and the canister vent valve 87, such as pressure sensor 98, for example. In still further embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system having undesired evaporative emissions based on changes in a fuel tank pressure during a diagnostic routine. When a pressure sensor is included upstream of isolation valve 85, such as canister pressure sensor 98, an evaporative emissions system having undesired evaporative emissions may be indicated based on changes in canister pressure during a diagnostic routine while isolation valve 85 is maintained closed.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and canister 90. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event (e.g., during refueling), and/or the quantity of fuel vapor desorbed during a purging operation. The canister temperature may thus be used to infer the canister load, while changes in canister temperature may be used to determine the capacity and/or integrity of the fuel vapor canister.

Fuel vapors released from canister 90, for example during a purging operation, may be directed into engine intake manifold 44 via purge line 91. The flow of vapors along purge line 91 may be regulated by canister purge valve 92, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 91 to prevent intake manifold pressure from flowing gases in the opposite direction of the purge flow. As such, the check valve may be necessary if the canister purge valve control is not accurately timed or the canister purge valve itself can be forced open by a high intake manifold pressure.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 85 and canister vent valve 87 while closing canister purge valve (CPV) 92 to direct refueling vapors into canister 90 while preventing fuel vapors from being directed into the intake manifold.

As another example, the fuel system may be operated in a refueling mode (e.g., when fuel tank refueling is requested by a vehicle operator), wherein the controller 12 may open isolation valve 85 and canister vent valve 87, while maintaining canister purge valve 92 closed, to depressurize the fuel tank before allowing enabling fuel to be added therein. As such, isolation valve 85 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 92 and canister vent valve while closing isolation valve 85. Herein, the vacuum generated by the intake manifold of the operating engine may be used to draw fresh air through vent 86 and through fuel vapor canister 90 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; crankcase vent tube pressure sensor 77, BP sensor 57, CIP sensor 61, TIP sensor 59, canister temperature sensor 97, etc. Furthermore, controller 12 may monitor and adjust the position of various actuators 118 based on input received from the various sensors. These actuators may include, for example, throttle 42, intake and exhaust valve systems 40, 41, and PCV valve 78, CPV 92, FTIV 85, etc. Storage medium read-only memory 112 can be programmed with computer readable data representing instructions executable by processor 108 for performing the methods described below, as well as other variants that are anticipated but not specifically listed.

Controller 12 may also be configured to intermittently perform undesired evaporative emission detection routines on fuel system 18 and/or evaporative emissions system 19. Tests may be performed by an evaporative level check module (ELCM) 99 communicatively coupled to controller 12. ELCM 99 may be coupled in vent 86, between canister 90 and the atmosphere. ELCM 99 may include a vacuum pump for applying negative pressure to the fuel system when administering a test. In some embodiments, the vacuum pump may be configured to be reversible. In other words, the vacuum pump may be configured to apply either a negative pressure or a positive pressure on the fuel system. ELCM 99 may further include a reference orifice and a pressure sensor 98. The reference orifice may enable a threshold pressure to be determined based on current ambient and operating conditions. Following the applying of vacuum to the fuel system, a change in pressure at pressure sensor 98 (e.g., an absolute change or a rate of change) may be monitored and compared to the threshold pressure. Based on the comparison, a fuel system may be diagnosed for undesired evaporative emissions. As such, various diagnostic detection tests may be performed while the engine is off (engine-off test) or while the engine is running (engine-on test). Tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Tests performed while the engine is not running may include sealing the fuel system following engine shut-off and monitoring a change in fuel tank pressure. This type of test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values. Following a vehicle-off event, as heat continues to be rejected from the engine into the fuel tank, the fuel tank pressure will initially rise. During conditions of relatively high ambient temperature, a pressure build above a threshold may be considered a passing test.

Further, controller 12 may be configured to intermittently perform detection routines on the crankcase ventilation system. This may include monitoring an output of crankcase vent line pressure sensor 77 when pre-determined conditions are met. For example, during engine cranking, intake manifold vacuum may be low. As such, the PCV valve may be open, causing a threshold flow of air through the crankcase and back into the intake manifold. As the engine speed increases following cranking, the manifold airflow increases. This may decrease the airflow through the crankcase vent line. In a V-type engine, this sequence of events causes a characteristic dip in the crankcase vent line pressure. However, if the crankcase vent line is disconnected at the crankcase side (e.g., second side 102), the characteristic dip may not be observed, and degradation of the crankcase vent line may be indicated.

Figure 2:
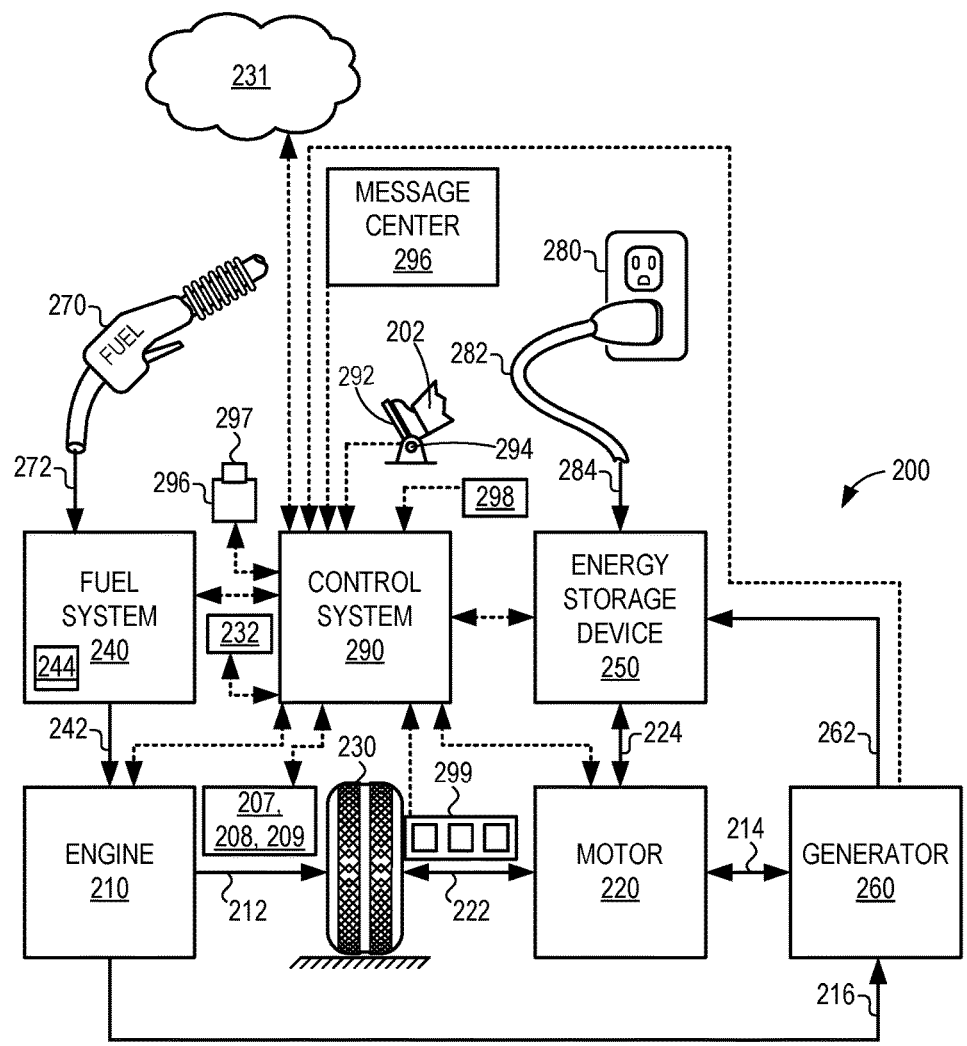
FIG. 2 schematically shows an example vehicle propulsion system.

FIG. 2 illustrates an example vehicle propulsion system 200. It may be understood that vehicle propulsion system 200 may comprise the same vehicle propulsion system as hybrid vehicle system 6 depicted at FIG. 1. Vehicle propulsion system 200 includes a fuel burning engine 210 and a motor 220. It may be understood that engine 210 may be the same as engine 10 depicted above at FIG. 1. As a non-limiting example, engine 210 comprises an internal combustion engine and motor 220 comprises an electric motor. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262.

During still other operating conditions, engine 210 may be operated by combusting fuel received from fuel system 240 as indicated by arrow 242. It may be understood that fuel system 240 may comprise the same fuel system as fuel system 18 depicted above at FIG. 1. For example, engine 210 may be operated to propel the vehicle via drive wheel 230 as indicated by arrow 212 while motor 220 is deactivated. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated to power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

Fuel system 240 may include one or more fuel storage tanks 244 for storing fuel on-board the vehicle. It may be understood that fuel storage tanks 244 may comprise the same fuel storage tank as fuel tank 20 depicted at FIG. 1. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 290 may communicate with one or more of engine 210, motor 220, fuel system 240, energy storage device 250, and generator 260. It may be understood that control system 290 may comprise the same control system as controller 12, depicted above at FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. Control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. It may be understood that pedal 292 may be comprise the same pedal as pedal 132 depicted above at FIG. 1. It may be further understood that pedal position sensor 294 may comprise the same pedal position sensor as pedal position sensor 134 depicted above at FIG. 1.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnected between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and sensors dedicated to indicating the occupancy-state of the vehicle, for example seat load cells 207, door sensing technology 208, and onboard cameras 209. Vehicle propulsion system 200 may further include a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

Figure 3A:
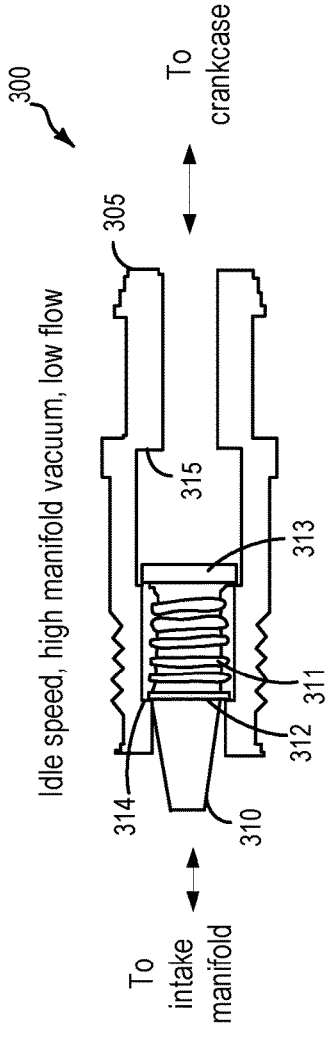
FIG. 3A illustrates a position of a PCV valve during idle speed, high intake manifold vacuum conditions.
Figure 3B:
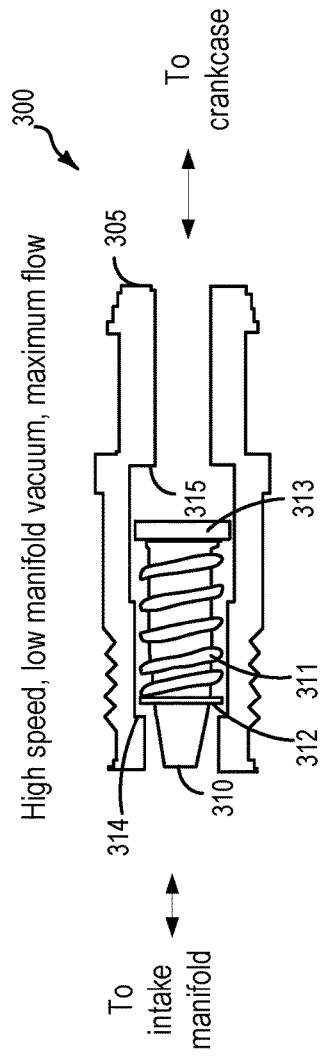
FIG. 3B illustrates a position of a PCV valve during high speed, low intake manifold vacuum conditions.
Figure 3C:
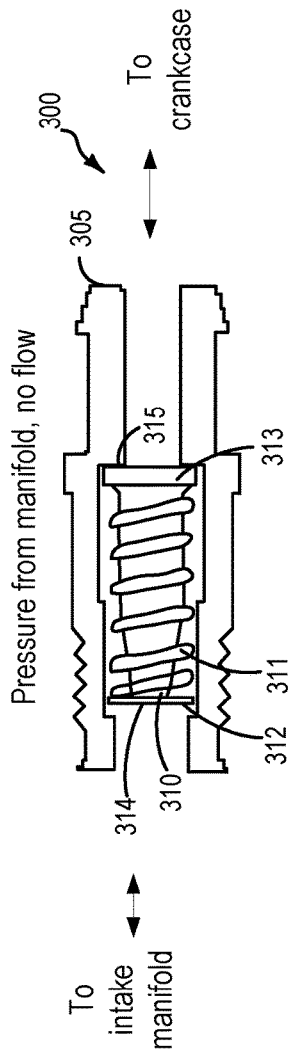
FIG. 3C illustrates a position of a PCV valve during conditions of positive intake manifold pressure conditions.

Turning to FIGS. 3A-3C, example illustrations of various conformations of a PCV valve during various engine operating conditions, is shown. More specifically, FIG. 3A illustrates a PCV valve 300 conformation during idle speed, high intake manifold vacuum conditions. FIG. 3B illustrates a conformation of PCV valve 300 during high speed, low intake manifold conditions. FIG. 3C illustrates a conformation of PCV valve 300 during conditions of positive pressure with respect to atmospheric pressure in the intake manifold. It may be understood that PCV valve 300 depicted at FIGS. 3A-3C may comprise the same PCV valve as PCV valve 78 depicted above at FIG. 1.

Turning to FIG. 3A, PCV valve 300 may include a PCV valve housing 305, a plunger 310, and a spring 311. Furthermore, PCV valve 300 may include a first pintle 312, and a second pintle 313. Responsive to conditions of idle speed and high intake manifold vacuum, the high intake manifold vacuum may draw the plunger 310 toward the intake manifold, resulting in the first pintle 312 seating against a first valve seat 314. As such, under high intake manifold vacuum conditions, PCV valve 300 adopts a low flow conformation. In other words, fluid flow from the crankcase may be prevented as a result of the first pintle 312 seating against the first valve seat 314.

Turning to FIG. 3B, PCV valve 300 is illustrated under conditions of high engine speed, and low intake manifold vacuum. Responsive to conditions of high engine speed, and low intake manifold vacuum, spring 311 may push first pintle 312 away from first valve seat 314, thus allowing more fluid flow. Furthermore, second pintle 313 may not contact second valve seat 315, and as such, a high engine speed, low intake manifold vacuum condition may represent a condition where fluid flow through PCV valve 300 is the least restricted.

Turning to FIG. 3C, PCV valve 300 is illustrated under conditions of positive intake manifold pressure. Under such conditions, PCV valve 300 may close. More specifically, positive pressure in the intake manifold may result in second pintle 313 seating against second valve seat 315, thus preventing fluid flow from the intake manifold to the crankcase.

As discussed above, the PCV valve may occupy different configurations as a function of intake manifold pressure. As such, by actively manipulating pressure in the intake manifold, the PCV may be diagnosed as to whether the PCV valve is stuck open, or stuck closed, as will be discussed in greater detail below. Specifically, a stuck open or closed PCV valve may result in driveability issues, which may include hesitation, surges, etc. For example, a stuck open PCV valve may result in surges at engine idle, the result of vapors being drawn from the crankcase to the intake manifold, as the air/fuel ratio is very sensitive to vapor concentrations at engine idle conditions. However, there are other engine malfunctions that may result in engine surges, hesitations, etc., and as such, indications of engine surge, hesitation, etc., may not effectively be utilized to diagnose PCV valve functionality. Thus, a diagnostic to accurately indicate PCV valve functionality, is desired.

Figure 4:
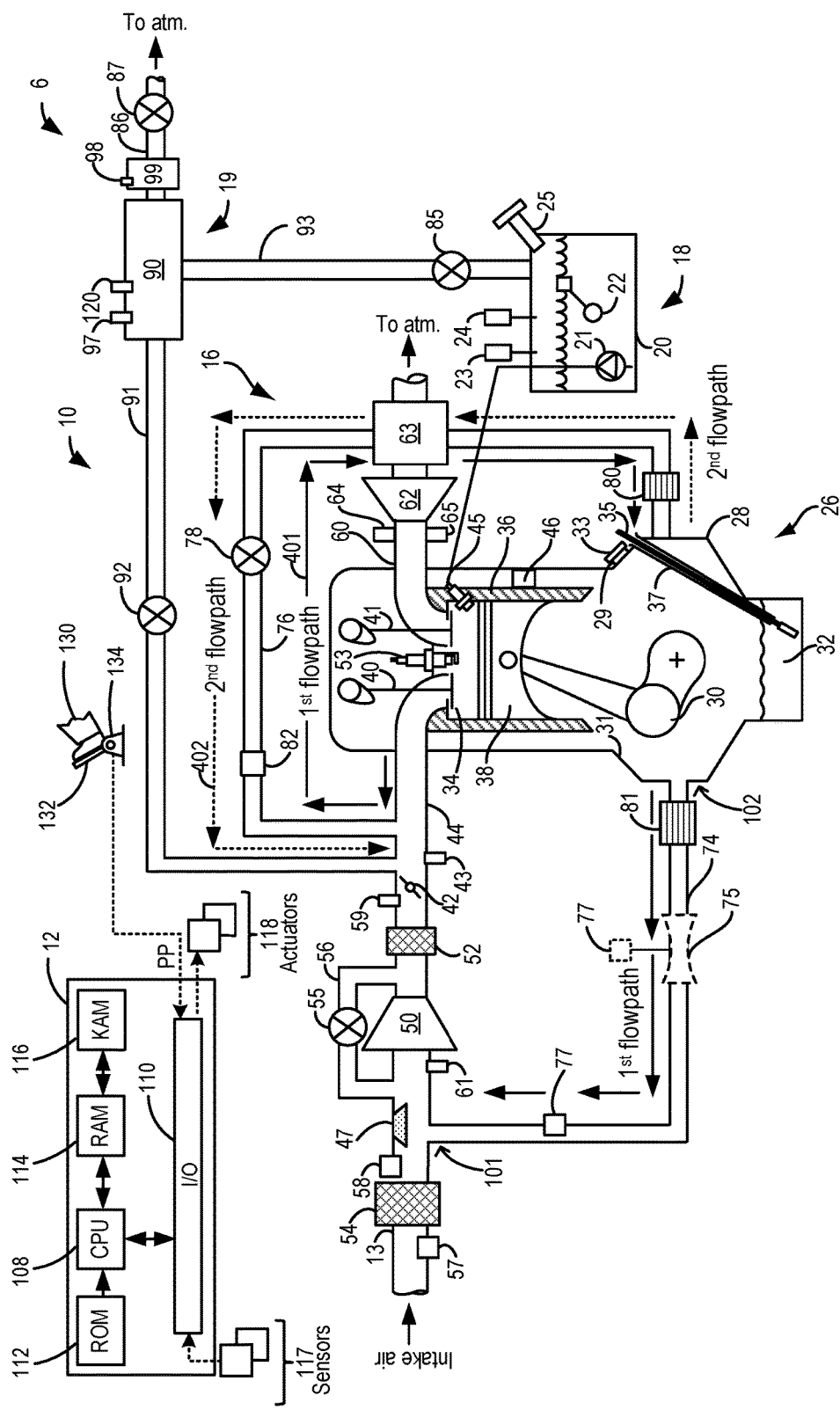
FIG. 4 shows a schematic description of an engine including an engine PCV system, including indications of fluid flow responsive to running the engine in a forward, or a reverse direction.

Turning to FIG. 4, such a diagnostic may be conducted by actively manipulating pressure in a vehicle intake manifold, such that it may be inferred as to whether the PCV valve is functioning as desired. FIG. 4 depicts the same illustration of hybrid vehicle 6 depicted at FIG. 1, but with indications of fluid flow during conditions where a PCV valve diagnostic procedure is being conducted.

Specifically, after a predetermined time duration after a key off event, the vehicle controller may be awakened to conduct a PCV valve diagnostic. First, the engine may be spun unfueled and without spark in reverse, which may result in a positive pressure build in the intake manifold. Positive pressure may develop in the intake manifold as a result of the engine running in reverse, due to the combination of the engine running in reverse and the restrictive nature of the air filter (e.g. 54). As such, positive pressure may build in the PCV line (e.g. 76). If the PCV is stuck in an open conformation, positive pressure may travel along first flowpath, represented by solid arrows 401. More specifically, positive pressure may travel from the intake manifold (e.g. 44), through the PCV line, through the crankcase (e.g. 28), and through the crankcase ventilation tube (e.g. 74), and may thus reach the crankcase pressure sensor (CKCP) (e.g. 77). Accordingly, if, during spinning the engine in reverse, positive pressure is indicated via the CKCP sensor, then it may be indicated that the PCV is stuck in an open conformation. However, if the PCV valve is functioning as desired, then no pressure change may be expected as indicated via the CKCP sensor, the result of the PCV valve closing responsive to positive intake manifold pressure, as discussed above with regard to FIG. 3C.

Furthermore, while monitoring the CKCP during spinning the engine in reverse, the intake air oxygen sensor (e.g. 43) may additionally be utilized to indicate when residual vapors present in the intake manifold, cylinders, and exhaust, are purged, the result of spinning the engine in reverse. For example, it may be indicated that the residual vapors have been purged from the intake manifold responsive to a lean condition (e.g. lean air/fuel ratio) indicated by the intake air oxygen sensor. If, while spinning the engine in reverse, no pressure change is indicated in the crankcase ventilation tube (e.g. 74), it may be indicated that the PCV valve is closed. However, there is the possibility that the PCV valve is not functioning as desired, but rather is stuck closed.

Thus, responsive to the indication that residual vapors have been purged from the intake manifold, and further responsive to an indication that the PCV valve is not stuck open, the engine may be spun in a forward direction. Furthermore the engine may be fueled, but without spark. More specifically, one or more fuel injector(s) (e.g. 45) may be activated during spinning the engine in the forward direction. Still further, a throttle (e.g. 42) may be commanded to an open position, to prevent intake manifold vacuum from developing while spinning the engine in the forward direction. As such, the PCV valve may be expected to occupy an open, high flow, configuration, such as depicted above with regard to FIG. 3B. By fueling the engine during spinning the engine in the forward direction, injected fuel may be drawn into the crankcase (e.g. 28) via piston wall crevices. For example, a sealing ability between piston rings (not shown), and the cylinder walls may be compromised when the engine is cold as compared to when the engine is hot. With fuel vapors drawn into the crankcase, and with the engine being spun in the forward direction, fuel vapors may travel along a second flowpath, indicated by dashed arrows 402. Accordingly, if the PCV valve is stuck closed, then the vapors may not reach the intake air oxygen sensor (e.g. 43). However, if the PCV valve is functioning as desired (e.g. not stuck closed), then the crankcase vapors may travel along the second flowpath, indicated by dashed arrows 402, and may result in a rich air/fuel ratio as indicated via the intake air oxygen sensor (e.g. 43). Such a method for diagnosing either a stuck open or stuck close PCV valve will be discussed in further detail below with regard to the method depicted at FIG. 6.

As discussed above, the method for conducting the PCV valve diagnostic relies on the ability to spin the engine in reverse after predetermined duration after a key off event. FIGS. 5A and 5B show an example circuit 500 that may be used for reversing a spin orientation of an electric motor (e.g. 220), where the electric motor may be utilized to spin the engine. Circuit 500 schematically depicts an H-Bridge circuit that may be used to run a motor 510 in a first (forward) direction and alternately in a second (reverse) direction. Circuit 500 comprises a first (LO) side 520 and a second (HI) side 530. Side 520 includes transistors 521 and 522, while side 530 includes transistors 531 and 532. Circuit 500 further includes a power source 540.

In FIG. 5A, transistors 521 and 532 are activated, while transistors 522 and 531 are off. In this confirmation, the left lead 551 of motor 510 is connected to power source 540, and the right lead 552 of motor 510 is connected to ground. In this way, motor 500 may run in a forward direction. When operating the engine in a forward direction via the motor, the engine may be in a cranking mode for initial combustion commencement.

In FIG. 5B, transistors 522 and 531 are activated, while transistors 521 and 532 are off. In this confirmation, the right lead 552 of motor 510 is connected to power source 540, and the left lead 551 of motor 510 is connected to ground. In this way, motor 500 may run in a reverse direction to drive the engine in a reverse orientation.

Thus, a system for a hybrid vehicle may comprise an engine including an engine intake manifold, and engine exhaust manifold, a crankcase, and a compressor supplying compressed air to the intake manifold. The system may further include an electric motor coupled to the engine, a crankcase ventilation tube connecting the crankcase to a fresh air intake passage upstream of the compressor, and a pressure sensor configured to indicate pressure in the crankcase ventilation tube. The system may further include a positive crankcase ventilation line connecting the crankcase to the intake manifold, a positive crankcase valve positioned in the positive crankcase ventilation line, and an intake air oxygen sensor positioned in the intake manifold. The system may further include a controller storing instructions in non-transitory memory that, when executed, cause the controller to, responsive to a predetermined time duration elapsing since a key-off event, spin the engine in a reverse direction via the electric motor and indicate whether the positive crankcase valve is stuck open based on a pressure level indicated via the pressure sensor configured to indicate pressure in the crankcase ventilation tube. Responsive to an indication that the positive crankcase valve is not stuck open, the controller may spin the engine in the forward direction via the electric motor and indicate whether the positive crankcase valve is stuck closed based on an air/fuel ratio in the intake manifold as indicated via the intake air oxygen sensor positioned in the intake manifold.

In a first example of the system, the system may further include wherein the controller further stores instructions in non-transitory memory, that when executed, cause the controller to indicate an air/fuel ratio in the intake manifold via the intake air oxygen sensor positioned in the intake manifold while the engine is being spun in the reverse direction, and wherein the engine is spun in the forward direction further responsive to an indication of a lean air/fuel ratio in the intake manifold while the engine is being spun in the reverse direction.

A second example of the system optionally includes the first example and further includes wherein the controller further stores instructions in non-transitory memory, that when executed, cause the controller to indicate that the positive crankcase valve is stuck open while the engine is being spun in the reverse direction responsive to pressure in the crankcase ventilation tube rising above a predetermined pressure change threshold as indicated via the pressure sensor.

A third example of the system optionally includes any one or more or each of the first and second examples, and further includes wherein the controller further stores instructions in non-transitory memory, that when executed, cause the controller to indicate that the positive crankcase valve is stuck closed while the engine is being spun in the forward direction responsive to an air/fuel ratio in the intake manifold as indicated via the intake air oxygen sensor being below a predetermined air/fuel ratio threshold.

A fourth example of the system optionally includes any one or more or each of the first through third examples, and further comprises a plurality of fuel injectors configured to deliver fuel to a plurality of engine cylinders, a plurality of spark plugs configured to provide spark to the plurality of engine cylinders. The controller may further store instructions in non-transitory memory, that when executed, case the controller to spin the engine in the reverse direction via the electric motor without delivering fuel to any of the plurality of engine cylinders, and without providing spark to any of the plurality of engine cylinders; and spin the engine in the forward direction via the electric motor while delivering fuel to one or more of the plurality of engine cylinders, but without providing spark to any of the plurality of engine cylinders, such that a portion of fuel injected into the one or more engine cylinders that is not combusted is drawn into the crankcase.

A fifth example of the system optionally includes any one or more or each of the first through fourth examples, and further comprises a throttle coupled to the intake manifold, and wherein the controller further stores instructions in non-transitory memory, that when executed, cause the controller to control the throttle to a position more open than a fully closed position while the engine is being spun in the reverse direction, and control the throttle to a fully open position while the engine is being spun in the forward direction.

A sixth example of the system optionally includes any one or more or each of the first through fifth examples, and further comprises a plurality of seat load cells; and wherein the controller further stores instructions in non-transitory memory, that when executed, cause the controller to prevent the engine from being spun in the reverse direction or the forward direction to determine with the positive crankcase valve is stuck open or stuck closed, responsive to an indication that the vehicle is occupied, as indicated via the plurality of seat load cells.

Turning now to FIG. 6, an example method for conducting a PCV valve diagnostic procedure is shown. More specifically, method 600 may be used to diagnose whether the PCV valve is stuck open, or stuck closed, by conducting the diagnostic after a predetermined time duration after a key-off event.

Method 600 will be described with reference to the systems described herein and shown in FIGS. 1-5B, though it should be understood that similar methods may be applied to other systems without departing from the scope of this disclosure. Method 600 may be carried out by a controller, such as controller 12 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 1, FIG. 2, and FIG. 4. The controller may transform operating states of the engine system via actuators, such as electric motor (e.g. 220), throttle (e.g. 42), etc., according to the method below.

Method 600 begins at 605 and may include evaluating current vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 610, method 600 may include indicating whether conditions are met for conducting a positive crankcase ventilation (PCV) valve diagnostic. Conditions being met for a PCV valve diagnostic may include a time duration since a key-off event greater than a predetermined time duration. For example, the predetermined time duration may comprise an amount of time where it may be expected that engine oil in the crankcase (e.g. 28) has cooled to a predetermined temperature. The predetermined time duration may in some examples comprise less than one hour, greater than one hour but less than three hours, or greater than three hours. However, such examples are meant to be illustrative, and are not meant to be limiting. In some examples, conditions being met for a PCV valve diagnostic may further include an indication that the vehicle is not occupied. For example, such an indication may be provided via seat load cells (e.g. 207) configured to indicate the presence or absence of a vehicle operator and/or passengers in the vehicle. Conditions being met for the PCV valve diagnostic procedure may further include an indication that a predetermined time period has elapsed since a previous PCV valve diagnostic procedure.

If conditions are not indicated to be met for conducting the PCV valve diagnostic procedure, method 600 may proceed to 615, and may include maintaining current vehicle operating conditions. For example, if the vehicle is operating via the engine, then engine operation may be maintained. If the vehicle is in a key-off condition, yet the predetermined time duration has not yet elapsed in order to conduct the PCV valve diagnostic, then the vehicle controller may be maintained in a sleep mode, for example.

Returning to 615, responsive to conditions being met for conducting the PCV valve diagnostic procedure, method 600 may proceed to 620, and may include waking the controller. Upon waking the controller, method 600 may proceed to 625, and may include spinning the engine in reverse. As discussed above, an electric motor (e.g. 220), may be operated to spin the engine in reverse. Accordingly, the controller may send a signal to the electric motor, commanding the electric motor to spin the engine in the reverse direction. More specifically, spinning the engine in reverse may include the controller actuating the electric motor to spin the engine in reverse. The controller may be further configured to disable spark and fuel injection. The engine may be spun unfueled at a predetermined speed, for example the engine may be spun in reverse at a relatively low speed, but may be spun at a higher speed if a larger pressure gradient is desired. When the engine is spun in the reverse direction, a vacuum is generated in the exhaust system, while a positive pressure with respect to atmospheric pressure is generated in the intake manifold. Furthermore, at 625, the controller may send a signal actuating the throttle (e.g. 42) to an open configuration. In some examples the degree to which the throttle is commanded open by the controller may be a percentage of a maximum amount of throttle opening possible (e.g. a position greater than, or more open, than a fully closed position). In still other examples, the throttle may be commanded open to a maximum, or fully open, amount (e.g. wide-open throttle).

Accordingly, at 625, with the engine being spun in reverse, and with the throttle at least partially opened, residual fuel vapors in the engine, intake manifold, cylinders, etc., may be routed past the compressor (e.g. 50), toward the air filter (e.g. 54). The air filter may act as a resistor to fluid flow, thus resulting in a buildup of positive pressure with respect to atmospheric pressure in the intake manifold. Furthermore, to prevent the routing of fuel vapors to atmosphere during spinning the engine in reverse, fuel vapors may be adsorbed via an AIS HC trap (e.g. 47) positioned downstream of the air filter, but upstream of the compressor (e.g. 50), and at a location where the crankcase ventilation tube (e.g. 74) couples to the intake passage (e.g. 13).

As positive pressure builds in the intake manifold while the engine is spun in reverse, such positive pressure may be communicated to the PCV valve (e.g. 78). As discussed above with regard to FIG. 3C, responsive to positive pressure communicated to the PCV valve, if the PCV valve is functioning as desired, then the PCV valve may be expected to close. Accordingly, if the PCV valve is functioning as desired, then pressure may be prevented from traveling along the first flowpath, where the first flowpath is indicated by solid arrows (e.g. 401) described above with respect to FIG. 4. Thus, responsive to the PCV valve functioning as desired, the CKCP sensor (e.g. 77) may not be expected to respond, as positive pressure may be prevented from being communicated along the first flowpath due to the closed PCV valve. However, in a condition where the PCV valve is stuck in an open configuration, similar to that depicted in FIG. 3B, then positive pressure may be communicated along the first flowpath, from the intake manifold, through the open PCV valve, through the crankcase (e.g. 28) and crankcase ventilation tube (e.g. 74), wherein the CKCP sensor may respond to the increased pressure.

Accordingly, proceeding to 630, it may be indicated as to whether the CKCP sensor response is greater than a predetermined CKCP pressure change threshold. Responsive to the CKCP sensor sensing an increase in positive pressure with respect to atmospheric pressure greater than the predetermined CKCP pressure change threshold during spinning the engine in reverse, method 600 may proceed to 635. At 635, method 600 may include indicating the PCV valve is stuck in an open configuration. Such an indication may be stored at the controller, for example. For example, a flag may be set at the controller, and a corresponding diagnostic trouble code may be set. Furthermore, indicating the PCV valve is stuck in an open configuration may include illuminating a malfunction indicator light (MIL) on a vehicle dashboard, for example, providing an indication to the vehicle operator of the need to service the vehicle.

Proceeding to 640, method 600 may include taking mitigating action responsive to the indication of the stuck open PCV valve. In one example, boosted engine operation may be limited, or discontinued during future drive cycles, until it is indicated that actions have been taken to ensure the PCV valve is functioning as desired. For example, if boosted engine operation were not limited, or discontinued, then the stuck open PCV valve may result in crankcase gasses and oil mist being blown into the inlet of the compressor, which may lead to a rapid oil consumption risk. Accordingly, such an adverse conditions may be reduced by limiting or discontinuing boosted engine operation.

Proceeding to 645, method 600 may include returning the engine system to default, key-off conditions. For example, the motor may be commanded by the controller to stop spinning the engine in reverse orientation. Furthermore the controller may send a signal actuating the throttle to a default key-off configuration. Method 600 may then end.

Returning to 630, if the CKCP sensor response during spinning the engine in reverse is less than the predetermined CKCP pressure change threshold, method 600 may proceed to 650. For example, although the CKCP response at 630 was indicated to be less than the predetermined CKCP pressure change threshold, thus indicating that the PCV valve is not stuck in an open configuration, it may be that the PCV valve is stuck in a closed configuration. Accordingly, at 650, method 600 may include indicating whether a lean condition (e.g. lean air/fuel ratio) is indicated in the intake manifold. For example, while spinning the engine in reverse, an air/fuel ratio in the intake manifold may be monitored via an intake air oxygen sensor (e.g. 43) positioned in the intake manifold. Initially, responsive to spinning the engine in reverse, the intake air oxygen sensor may indicate a rich air/fuel ratio, as residual fuel vapors in the intake, as well as the engine cylinders and exhaust are routed in the direction of the intake air oxygen sensor. However, over the course of spinning the engine in reverse, as residual fuel vapors are routed towards the air filter (e.g. 54) whereby the residual fuel vapors may be adsorbed via the AIS HC trap (e.g. 47), the intake air oxygen sensor may switch to indicating a lean condition.

Responsive to an indication of a lean air/fuel ratio in the intake manifold, and under conditions wherein the CKCP response is indicated to be less than the predetermined CKCP pressure change threshold, method 600 may proceed to 655. At 655, method 600 may include spinning the engine in the forward direction, and may further include commanding the throttle to a fully open configuration. For example, the controller may send a signal to the electric motor (e.g. 220), actuating the electric motor to spin the engine in the forward direction, instead of the reverse direction. Furthermore, the controller may send a signal to the throttle actuating the throttle to a fully open configuration. Commanding the throttle to the fully open position may prevent substantial intake manifold vacuum from developing responsive to spinning the engine in the forward direction. By preventing the development of significant intake manifold vacuum, the PCV valve may be prevented from closing. For example, as discussed above with regard to FIG. 3A, responsive to intake manifold vacuum, the PCV valve may close. However, because the PCV valve diagnostic is concerned with whether the PCV valve is stuck closed, it is desired that the PCV valve adopt a configuration wherein the PCV valve is in an open configuration, such as that depicted above with regard to FIG. 3B. As such, while spinning the engine in the forward direction with the throttle commanded open, significant intake manifold vacuum may be prevented, thus rendering the PCV valve in the open configuration depicted in FIG. 3B, provided the PCV valve is functioning as desired.

Proceeding to 660, method 600 may include activating fuel injection to one or more engine cylinders, without providing spark to the one or more engine cylinders. More specifically the controller may send a signal to one or more fuel injector(s) (e.g. 45), actuating the one or more fuel injectors to supply fuel to the one or more engine cylinders, while preventing the fuel from being combusted by not providing spark to the one or more engine cylinders.

By spinning the engine in the forward direction, while providing fueling to one or more engine cylinders, the fuel provided to the one or more engine cylinders may be drawn into the crankcase via piston wall crevices as the pistons (e.g. 38) move up and down within the cylinders. For example, because the PCV valve diagnostic depicted herein is conducted after a predetermined time duration since a key-off event, it may be understood that the engine may be cold as compared to a condition where the engine has been recently operating, and as such, a sealing ability between piston rings and engine cylinders may be less when cold as compared to hot. Thus, fuel may be drawn into the crankcase during spinning the engine in the forward direction while injecting fuel into one or more engine cylinders.

The injected fuel and vapors may thus travel from the crankcase, through the PCV line (e.g. 76), past the PCV valve (e.g. 78), and to the intake manifold (e.g. 44) responsive to the PCV valve functioning as desired. In other words, if the PCV valve is functioning as desired, the PCV valve may be expected to adopt a primarily open configuration, which may enable fuel vapors in the crankcase to flow through the open PCV valve to the intake manifold. However, if the PCV valve is not functioning as desired (e.g. stuck closed), then the flow of fuel vapors from the crankcase may be prevented.

Accordingly, proceeding to 665, method 600 may include indicating whether a rich air/fuel ratio is indicated in the intake manifold. As discussed above, a rich condition may be indicated via the intake air oxygen sensor (e.g. 43) positioned in the intake manifold. In some examples, indicating a rich condition may comprise the intake air oxygen sensor indicating an air fuel ratio less than a predetermined air/fuel ratio threshold. If a rich air/fuel ratio in the intake manifold is not indicated, method 600 may proceed to 670, and may include indicating the PCV valve is stuck in a closed configuration. Such a closed configuration may comprise the PCV valve being stuck in a configuration such as that depicted in FIG. 3A, or a configuration such as that depicted in FIG. 3C.

Indicating the PCV valve is stuck closed at 670 may include storing the result at the controller. For example, a flag may be set at the controller, and a corresponding diagnostic trouble code may be set. Furthermore, indicating the PCV valve is stuck in a closed configuration may include illuminating a malfunction indicator light (MIL) on a vehicle dashboard, for example, providing an indication to the vehicle operator of the need to service the vehicle.

Proceeding to 675, method 600 may include taking mitigating action responsive to the indication of the stuck closed PCV valve. In one example, engine speed may be limited responsive to the indication of the stuck closed PCV valve. However, a stuck closed PCV valve may result in engine sludge formation in the oiled portions of the engine, and may further result in crankcase pressures that may result in comprised engine operation due to degraded gaskets and seals due to the elevated crankcase pressures. Accordingly, appropriate mitigating action may include remedying the stuck closed PCV valve by having the vehicle serviced, as discussed above.

Proceeding to 645, method 600 may include returning the engine system to default, key-off conditions. For example, the motor may be commanded by the controller to stop spinning the engine in forward orientation. Furthermore the controller may send a signal actuating the throttle to a default key-off configuration. Still further, the controller may send a signal actuating the one or more fuel injectors to stop the injection of fuel to the one or more engine cylinders. Method 600 may then end.

Returning to 665, responsive to a rich air/fuel ratio being indicated during spinning the engine in the forward direction, with the throttle commanded by the controller to a fully opened position, and with fuel being provided to one or more engine cylinders, method 600 may proceed to 680. At 680, method 600 may include indicating the PCV valve is functioning as desired. More specifically, because injected fuel that has been drawn into the crankcase during spinning the engine in the forward direction is indicated to have traveled through the PCV line, past the PCV valve, and to the intake manifold, wherein the intake oxygen sensor (e.g. 43) responded to the presence of fuel vapors, it may be determined that the PCV valve is not stuck closed, but rather is functioning as desired. If the PCV valve were not functioning as desired, then the intake oxygen sensor would not have responded to the presence of fuel vapors, as the stuck closed PCV valve would have prevented the fuel vapors from traveling to the intake manifold.

As the PCV valve is indicated to be functioning as desired, such an indication may be stored at the controller. For example, it may be indicated that the PCV valve diagnostic was conducted, and that the PCV valve is functioning as desired. Furthermore, because the PCV valve is indicated to be functioning as desired, no mitigating action may be taken.

Accordingly, proceeding to 645, method 600 may include returning the engine system to default, key-off conditions. For example, the motor may be commanded by the controller to stop spinning the engine in forward orientation. Furthermore the controller may send a signal actuating the throttle to a default key-off configuration. Still further, the controller may send a signal actuating the one or more fuel injectors to stop the injection of fuel to the one or more engine cylinders. Method 600 may then end.

Thus, in one example, a method comprises controlling a fluid flow from a crankcase of an engine to an intake manifold of the engine via a positive crankcase ventilation valve; and in a first condition, indicating whether the positive crankcase valve is stuck open responsive to spinning the engine unfueled in a reverse direction; and in a second condition, indicating whether the positive crankcase valve is stuck closed responsive to spinning the engine fueled in a forward direction. In a first example of the method, the method further comprises indicating pressure in a crankcase ventilation tube via a pressure sensor, the crankcase ventilation tube fluidically coupling the crankcase to an air intake system configured to draw intake air into the engine; and in the first condition, indicating the positive crankcase valve is stuck open responsive to an increase in pressure in the crankcase ventilation tube above a predetermined pressure change threshold as indicated via the pressure sensor. A second example of the method optionally includes the first example, and further comprises indicating an air/fuel ratio in the intake manifold of the engine via an intake air oxygen sensor; and in the second condition, indicating the positive crankcase valve is stuck closed responsive to the indicated air/fuel ratio less than a predetermined air/fuel ratio threshold. A third example of the method optionally includes any one or more or each of the first and second examples, and further includes wherein the first condition further comprises indicating air/fuel ratio in the intake manifold via the intake air oxygen sensor during spinning the engine unfueled in reverse; and wherein the second condition is commenced responsive to an indication of a lean air/fuel ratio in the intake manifold as indicated by the intake air oxygen sensor. A fourth example of the method optionally includes any one or more or each of the first through third examples, and wherein the first condition further comprises sleeping a vehicle controller responsive to a key-off event; and wherein both the first condition and the second condition are carried out responsive to the controller being woken up after a predetermined time period after the key-off event. A fifth example of the method optionally includes any one or more or each of the first through fourth examples and further comprises controlling an intake air flow to the engine via a throttle positioned in the intake manifold; and in the first condition, controlling the throttle to a position more open than a closed position, and in the second condition, controlling the throttle to a fully open position. A sixth example of the method optionally includes any one or more or each of the first through fifth examples and further comprises controlling fuel injection to one or more cylinders of the engine via one or more fuel injectors; providing spark to one or more of the engine cylinders via one or more spark plugs; wherein the first condition includes spinning the engine unfueled in reverse without fuel injection and without spark to any of the engine cylinders; and wherein the second condition includes spinning the engine fueled in the forward direction by providing fuel injection to one or more cylinders, but not providing spark to the one or more cylinders receiving fuel injection so that fuel injected to the one or more engine cylinders is not combusted. A seventh example of the method optionally includes any one or more or each of the first through sixth examples, and further includes wherein fuel injected into the one or more engine cylinders that is not combusted is drawn into the crankcase. A ninth example of the method optionally includes any one or more or each of the first through eighth examples and further comprises indicating a vehicle occupancy state via seat load cells; and wherein both the first condition and the second condition are conducted responsive to an indication of an absence of vehicle occupancy.

Another example of a method comprises controlling a fluid flow from a crankcase of an engine to an intake manifold of the engine via a positive crankcase ventilation valve positioned in a positive crankcase line; monitoring a pressure in a crankcase ventilation tube connecting the crankcase to an air intake system via a pressure sensor positioned in the crankcase ventilation tube; indicating an air/fuel ratio in the intake manifold via an intake air oxygen sensor; and providing fuel and spark to a plurality of engine cylinders via a plurality of fuel injectors and a plurality of spark plugs. Responsive to conditions being met for conducting a positive crankcase valve diagnostic procedure, the method may include spinning the engine unfueled and without spark in a reverse direction and indicating the positive crankcase valve is stuck open responsive to pressure in the crankcase ventilation tube coupling the crankcase to the air intake system being greater than a predetermined pressure threshold. Responsive to an indication that the positive crankcase valve is not stuck closed and further responsive to an indication of a lean air/fuel ratio in the intake manifold, the method may include spinning the engine fueled but without providing spark in a forward direction and indicating the positive crankcase valve is stuck closed responsive to an air/fuel ratio in the intake manifold below a predetermined air/fuel ratio threshold while spinning the engine unfueled in the forward direction.

In a first example of the method, the method may further include wherein conditions being met for the positive crankcase valve diagnostic procedure include a time since a key-off event greater than a predetermined time duration, and a threshold duration of time elapsing since a previously conducted positive crankcase valve diagnostic procedure; wherein a vehicle controller is put into a sleep mode responsive to the key-off event; and wherein the vehicle controller is woken up from the sleep mode responsive to the predetermined time duration elapsing after the key-off event. A second example of the method optionally includes the first example and further includes wherein positive pressure with respect to atmospheric pressure is routed from the intake manifold, through the positive crankcase line, through the crankcase, and through the crankcase ventilation tube while spinning the engine unfueled in the reverse direction under conditions wherein the positive crankcase valve is stuck open; and wherein fluid flow is routed from the crankcase, through the positive crankcase line, and to the intake manifold while spinning the engine fueled in the forward direction responsive to the positive crankcase valve not being stuck closed. A third example of the method optionally includes any one or more or each of the first and second examples, and further comprises controlling an intake air flow to the engine via a throttle upstream of the intake manifold; controlling the throttle to a position greater than a fully closed position while spinning the engine in reverse; and controlling the throttle to a fully open position while spinning the engine in the forward direction.

Turning now to FIG. 7, an example timeline 700 is shown for conducting a PCV valve diagnostic procedure according to the method depicted herein and shown in FIG. 6, and as applied to the systems described herein and with reference to FIGS. 1-5B. Timeline 700 includes plot 705, indicating whether conditions are met (yes), or not (no), for conducting a PCV valve diagnostic procedure, over time. Timeline 700 further includes plot 710, indicating an engine status including whether an engine is spinning in the forward (fwd), or reverse (rev) direction, over time. Timeline 700 further includes plot 715, indicating a throttle position status, over time. The throttle may be in a closed configuration, an open configuration, or a position between open and closed. Timeline 700 further includes plot 720, indicating whether a controller is asleep, or awake, over time. Timeline 700 further includes plot 725, indicating pressure in a crankcase ventilation tube via a crankcase pressure (CKCP) sensor, over time. Pressure in the crankcase ventilation tube as indicated via the CKCP sensor may be at atmospheric pressure (atm), or positive (+) with respect to atmospheric pressure. Line 726 represents a predetermined CKCP pressure change threshold which, if reached may indicate a stuck open PCV valve.

Timeline 700 further includes plot 730, indicating whether an intake air oxygen sensor (IAO2) positioned downstream of a throttle (e.g. 42) indicates a rich, or lean air/fuel ratio, over time. Line 731 represents a threshold concentration of air/fuel ratio, below which may indicate a stuck closed PCV valve. Timeline 700 further includes plot 735, indicating a fuel injection status (on or off) of one or more fuel injectors, over time. Timeline 700 further includes plot 740, indicating whether the PCV valve is stuck open (yes) or not (no), and plot 745, indicating whether the PCV valve is stuck closed (yes) or not (no), over time.

At time t0, it may be understood that the vehicle is in a key-off condition. However, conditions for conducting the PCV valve test diagnostic are not yet indicated to be met, illustrated by plot 705. As the vehicle is in a key-off condition, the engine is off, indicated by plot 710. The throttle is in a substantially closed conformation, indicated by plot 715, and the controller is in a sleep mode of operation, indicated by plot 720. As the vehicle is in a key-off condition, pressure in the crankcase ventilation tube (e.g. 74) is near atmospheric pressure, as determined via the CKCP sensor (e.g. 77), illustrated by plot 725. Furthermore, an air/fuel ratio in the intake manifold is slightly lean, indicated by plot 730. However, while both the pressure in the crankcase ventilation tube, and the concentration of fuel vapors in the intake manifold are indicated between time t0 and t1, it may be understood that in fact, with the controller in a sleep mode of operation, such information may not be indicated by either the CKCP sensor, or the IAO2 sensor. Rather, the representation of pressure via plot 725, and the representation of fuel vapor concentration via plot 730 are indicated between time t0 and t1 for reference. Responsive to a transition to an awake mode, both pressure in the crankcase ventilation tube and fuel vapor concentration in the intake manifold may be measurable via the CKCP sensor and IAO2 sensor, respectively.

Furthermore, at time t0, fuel injection to one or more engine cylinders, via one or more fuel injectors (e.g. 45), is indicated to be off, illustrated by plot 735. As the current PCV valve diagnostic has not yet been conducted, the PCV valve is not indicated to be stuck in an open conformation, illustrated by plot 740. Similarly, the PCV valve is not indicated to be stuck in a closed conformation, illustrated by plot 745.

At time t1, conditions are indicated to be met for conducting the PCV valve diagnostic procedure. As discussed above, conditions being met for a PCV valve diagnostic may include a time duration since a key-off event greater than a predetermined time duration, an indication that the vehicle is not occupied, that a predetermined time period has elapsed since a previous PCV valve diagnostic procedure, etc.

As conditions are indicated to be met for conducting the PCV valve diagnostic procedure at time t1, the controller is triggered to an awake mode, thus enabling the controller to command, or actuate, the throttle (e.g. 42) to a position between fully open and fully closed, and further to command, or actuate, the engine to spin in a reverse mode of operation. More specifically, the controller may actuate an electric motor (e.g. 220) to spin the engine in a reverse mode. With the engine commanded via the controller to spin in a reverse direction, pressure in the crankcase ventilation tube (e.g. 74) may be monitored via the CKCP sensor (e.g. 77). As discussed above, if the CKCP sensor responds during the period of time that the engine is being spun in reverse, it may be indicative of a stuck open PCV valve. However, between time t1 and t2, pressure in the crankcase ventilation tube as monitored by the CKCP sensor remains below the predetermined CKCP pressure change threshold represented by line 726. As such, it may be indicated that the PCV valve is not stuck in an open configuration. Accordingly, a determination that the PCV valve is stuck open is not indicated between time t1 and t2, as illustrated by plot 740.

Furthermore, between time t1 and t2, fuel vapor concentration in the intake manifold (e.g. 44) rises (e.g. becomes more rich), and then falls (e.g. becomes more lean), as indicated by an intake air oxygen sensor (e.g. 43), positioned in the intake manifold. More specifically, residual fuel vapors in the intake manifold, engine cylinders, exhaust, etc., may result in the intake air oxygen sensor indicating an increase in fuel vapor concentration (e.g. rich air/fuel ratio) while the engine is spinning in reverse. However, as the fuel vapors are routed towards an intake air filter (e.g. 54), the concentration is indicated to drop (e.g. the air/fuel ratio becomes more lean). As discussed above, to prevent fuel vapors from being routed through the intake air filter, to atmosphere, an air intake system hydrocarbon (AIS HC) trap may be positioned just downstream of the air intake filter, such that fuel vapors routed toward the air filter during spinning the engine in reverse may be adsorbed via the AIS HC trap.

At time t2, responsive to an indication that the PCV valve is not stuck in an open configuration, and further responsive to an indication that the air/fuel ratio is lean, the engine may be commanded to spin in a forward mode of operation. More specifically, an electric motor (e.g. 220) may be commanded, or actuated, via the controller to spin the engine in the forward mode of operation. Furthermore, the controller may send a signal to the throttle (e.g. 42), actuating the throttle to a fully-open position.

At time t3, with the engine spinning in the forward direction, and with the throttle commanded to the fully-open position, fuel injection to the engine cylinders may be commanded via the controller. For example, the controller may send a signal to one or more fuel injectors (e.g. 45), actuating the one or more fuel injectors to commence injection of fuel into one or more engine cylinders. However, spark may not be provided to the engine cylinders, such that fuel is injected but no fuel is combusted during the spinning of the engine in the forward direction. As discussed above, with the engine spinning in the forward direction, and with the throttle positioned in the fully-open configuration, the PCV valve may be expected to adopt an open configuration, such as the configuration illustrated in FIG. 3B. However, it may be possible that the PCV valve is stuck in a closed configuration.

Between time t3 and t4, with fuel being injected to one or more engine cylinders, and with the engine being spun in the forward direction, fuel vapors may be drawn into the crankcase, into the PCV line (e.g. 76), through the PCV valve, and to the intake manifold. However, if the PCV valve is stuck closed, then fuel vapors may not be routed through the PCV line, to the intake manifold. Accordingly, by monitoring air/fuel ratio in the intake manifold between time t3 and t4, it may be indicated as to whether the PCV valve is functioning as desired, or if the PCV valve is indicated to be stuck closed.

Accordingly, between time t3 and t4, the air/fuel ratio in the intake manifold may be monitored via the intake air oxygen sensor. In example timeline 700, the air/fuel ratio as monitored via the intake air oxygen sensor is indicated to remain below an air/fuel ratio threshold, represented by line 731. Thus, because fuel vapors are not indicated to be traveling from the crankcase, through the PCV line, and to the intake manifold, it may be determined that the PCV valve is in a stuck closed configuration. Accordingly, at time t4, the PCV valve is indicated to be stuck closed, illustrated by plot 745. As discussed above, such a result may be stored at the controller, and a malfunction indicator light (MIL) may be illuminated on the vehicle dash to alert the vehicle operator of the need to service the vehicle. In some examples, vehicle speed may be limited responsive to the indication of the stuck closed PCV valve, as discussed above.

At time t5, responsive to the indication that the PCV valve is stuck closed, conditions for conducting the PCV valve test may no longer be indicated to be met, as the test is complete. As such, the engine may be commanded via the controller to an off status, indicated by plot 710. Furthermore, the throttle may be returned to a default key-off position, indicated by plot 715. With the PCV valve diagnostic test complete at time t6, and with the engine commanded to an off configuration and the throttle commanded to a default configuration, the controller may be triggered to a sleep mode, indicated by plot 720.

In this way, a PCV valve may be diagnosed as to whether the PCV valve is in a stuck open, or stuck closed conformation, after a key-off event, and under conditions where a vehicle operator or other passengers may not be present in the vehicle to notice the test being conducted. By diagnosing whether the PCV valve is stuck open or closed, potential issues resulting from a degraded PCV valve may be reduced or avoided, such as engine degradation due to compromised gaskets, seals, etc., resulting from elevated crankcase pressures in the case of a stuck closed PCV valve, or surges at idle due to a stuck open PCV valve.

The technical effect is to recognize that a stuck open PCV valve may be diagnosed by spinning an engine unfueled and without spark in reverse via an electric motor, and that a stuck closed PCV valve may be diagnosed by spinning the engine fueled but without spark in the forward direction. More specifically, the technical effect is to recognize that positive pressure in the intake manifold during spinning the engine in reverse may result in a crankcase pressure sensor positioned in a crankcase ventilation tube responding to the positive pressure in a condition where the PCV valve is stuck open. Furthermore, the technical effect is to recognize that by spinning the engine fueled but without spark in the forward direction, fuel vapors may be drawn into the crankcase and routed to the intake manifold under conditions where the PCV valve is functioning as desired, but not under conditions where the PCV valve is stuck closed. As such, the system and methods depicted herein enables a diagnosis of whether the PCV valve is stuck open, or closed, during a key off condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
controlling a fluid flow from a crankcase of an engine to an intake manifold of the engine via a positive crankcase ventilation valve; and
in a first condition, indicating whether the positive crankcase valve is stuck open responsive to spinning the engine unfueled in a reverse direction; and
in a second condition, indicating whether the positive crankcase valve is stuck closed responsive to spinning the engine fueled in a forward direction.

2. The method of claim 1, further comprising:
indicating pressure in a crankcase ventilation tube via a pressure sensor, the crankcase ventilation tube fluidically coupling the crankcase to an air intake system configured to draw intake air into the engine; and
in the first condition, indicating the positive crankcase valve is stuck open responsive to an increase in pressure in the crankcase ventilation tube above a predetermined pressure change threshold as indicated via the pressure sensor.

3. The method of claim 1, further comprising:
sleeping a vehicle controller responsive to a key-off event; and
wherein both the first condition and the second condition are carried out responsive to the controller being woken up after a predetermined time period after the key-off event.

4. The method of claim 1, further comprising:
controlling an intake air flow to the engine via a throttle positioned in the intake manifold; and
in the first condition, controlling the throttle to a position more open than a closed position, and in the second condition, controlling the throttle to a fully open position.

5. The method of claim 1, further comprising:
indicating a vehicle occupancy state via seat load cells; and
wherein both the first condition and the second condition are conducted responsive to an indication of an absence of vehicle occupancy.

6. The method of claim 1, further comprising:
indicating an air/fuel ratio in the intake manifold of the engine via an intake air oxygen sensor; and
in the second condition, indicating the positive crankcase valve is stuck closed responsive to the indicated air/fuel ratio less than a predetermined air/fuel ratio threshold.

7. The method of claim 6, wherein the first condition further comprises indicating air/fuel ratio in the intake manifold via the intake air oxygen sensor during spinning the engine unfueled in reverse; and
wherein the second condition is commenced responsive to an indication of a lean air/fuel ratio in the intake manifold as indicated by the intake air oxygen sensor.

8. The method of claim 1, further comprising:
controlling fuel injection to one or more cylinders of the engine via one or more fuel injectors;
providing spark to one or more of the engine cylinders via one or more spark plugs;
wherein the first condition includes spinning the engine unfueled in reverse without fuel injection and without spark to any of the engine cylinders; and
wherein the second condition includes spinning the engine fueled in the forward direction by providing fuel injection to one or more cylinders, but not providing spark to the one or more cylinders receiving fuel injection so that fuel injected to the one or more engine cylinders is not combusted.

9. The method of claim 8, wherein fuel injected into the one or more engine cylinders that is not combusted is drawn into the crankcase.

10. A system for a hybrid vehicle, comprising:
an engine including an engine intake manifold, an engine exhaust manifold, a crankcase, and a compressor supplying compressed air to the intake manifold;
an electric motor coupled to the engine;
a crankcase ventilation tube connecting the crankcase to a fresh air intake passage upstream of the compressor;
a pressure sensor configured to indicate pressure in the crankcase ventilation tube;
a positive crankcase ventilation line connecting the crankcase to the intake manifold;
a positive crankcase valve positioned in the positive crankcase ventilation line;
an intake air oxygen sensor positioned in the intake manifold; and
a controller storing instructions in non-transitory memory that, when executed, cause the controller to:
responsive to a predetermined time duration elapsing since a key-off event, spin the engine in a reverse direction via the electric motor and indicate whether the positive crankcase valve is stuck open based on a pressure level indicated via the pressure sensor configured to indicate pressure in the crankcase ventilation tube; and
responsive to an indication that the positive crankcase valve is not stuck open:
spin the engine in the forward direction via the electric motor and indicate whether the positive crankcase valve is stuck closed based on an air/fuel ratio in the intake manifold as indicated via the intake air oxygen sensor positioned in the intake manifold.

11. The system of claim 10, wherein the controller further stores instructions in non-transitory memory, that when executed, cause the controller to:
indicate an air/fuel ratio in the intake manifold via the intake air oxygen sensor positioned in the intake manifold while the engine is being spun in the reverse direction; and
wherein the engine is spun in the forward direction further responsive to an indication of a lean air/fuel ratio in the intake manifold while the engine is being spun in the reverse direction.

12. The system of claim 10, wherein the controller further stores instructions in non-transitory memory, that when executed, cause the controller to:
indicate that the positive crankcase valve is stuck open while the engine is being spun in the reverse direction responsive to pressure in the crankcase ventilation tube rising above a predetermined pressure change threshold as indicated via the pressure sensor.

13. The system of claim 10, wherein the controller further stores instructions in non-transitory memory, that when executed, cause the controller to:
indicate that the positive crankcase valve is stuck closed while the engine is being spun in the forward direction responsive to an air/fuel ratio in the intake manifold as indicated via the intake air oxygen sensor being below a predetermined air/fuel ratio threshold.

14. The system of claim 10, further comprising:
a plurality of fuel injectors configured to deliver fuel to a plurality of engine cylinders;
a plurality of spark plugs configured to provide spark to the plurality of engine cylinders; and
wherein the controller further stores instructions in non-transitory memory, that when executed, cause the controller to:
spin the engine in the reverse direction via the electric motor without delivering fuel to any of the plurality of engine cylinders, and without providing spark to any of the plurality of engine cylinders; and
spin the engine in the forward direction via the electric motor while delivering fuel to one or more of the plurality of engine cylinders, but without providing spark to any of the plurality of engine cylinders, such that a portion of fuel injected into the one or more engine cylinders that is not combusted is drawn into the crankcase.

15. The system of claim 10, further comprising:
a throttle coupled to the intake manifold; and
wherein the controller further stores instructions in non-transitory memory, that when executed, cause the controller to:
control the throttle to a position more open than a fully closed position while the engine is being spun in the reverse direction, and control the throttle to a fully open position while the engine is being spun in the forward direction.

16. The system of claim 10, further comprising:
a plurality of seat load cells; and
wherein the controller further stores instructions in non-transitory memory, that when executed, cause the controller to:
prevent the engine from being spun in the reverse direction or the forward direction to determine with the positive crankcase valve is stuck open or stuck closed, responsive to an indication that the vehicle is occupied, as indicated via the plurality of seat load cells.

17. A method comprising:
controlling a fluid flow from a crankcase of an engine to an intake manifold of the engine via a positive crankcase ventilation valve positioned in a positive crankcase line;
monitoring a pressure in a crankcase ventilation tube connecting the crankcase to an air intake system via a pressure sensor positioned in the crankcase ventilation tube;
indicating an air/fuel ratio in the intake manifold via an intake air oxygen sensor;
providing fuel and spark to a plurality of engine cylinders via a plurality of fuel injectors and a plurality of spark plugs; and
responsive to conditions being met for conducting a positive crankcase valve diagnostic procedure:
spinning the engine unfueled and without spark in a reverse direction and indicating the positive crankcase valve is stuck open responsive to pressure in the crankcase ventilation tube coupling the crankcase to the air intake system being greater than a predetermined pressure threshold; and
responsive to an indication that the positive crankcase valve is not stuck closed and further responsive to an indication of a lean air/fuel ratio in the intake manifold:
spinning the engine fueled but without providing spark in a forward direction and indicating the positive crankcase valve is stuck closed responsive to an air/fuel ratio in the intake manifold below a predetermined air/fuel ratio threshold while spinning the engine unfueled in the forward direction.

18. The method of claim 17, wherein conditions being met for the positive crankcase valve diagnostic procedure include a time since a key-off event greater than a predetermined time duration, and a threshold duration of time elapsing since a previously conducted positive crankcase valve diagnostic procedure;
   wherein a vehicle controller is put into a sleep mode responsive to the key-off event; and
   wherein the vehicle controller is woken up from the sleep mode responsive to the predetermined time duration elapsing after the key-off event.

19. The method of claim 17, wherein positive pressure with respect to atmospheric pressure is routed from the intake manifold, through the positive crankcase line, through the crankcase, and through the crankcase ventilation tube while spinning the engine unfueled in the reverse direction under conditions wherein the positive crankcase valve is stuck open; and
   wherein fluid flow is routed from the crankcase, through the positive crankcase line, and to the intake manifold while spinning the engine fueled in the forward direction responsive to the positive crankcase valve not being stuck closed.

20. The method of claim 17, further comprising:
controlling an intake air flow to the engine via a throttle upstream of the intake manifold; and
controlling the throttle to a position greater than a fully closed position while spinning the engine in reverse; and
controlling the throttle to a fully open position while spinning the engine in the forward direction.

* * * * *